US012187341B2

(12) United States Patent
Park

(10) Patent No.: US 12,187,341 B2
(45) Date of Patent: Jan. 7, 2025

(54) VEHICLE BODY REINFORCEMENT STRUCTURE OF ELECTRIC VEHICLE

(71) Applicants: Hyundai Motor Company, Seoul (KR); Kia Corporation, Seoul (KR)

(72) Inventor: Jiwoong Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 360 days.

(21) Appl. No.: 17/832,864

(22) Filed: Jun. 6, 2022

(65) Prior Publication Data

US 2023/0021039 A1    Jan. 19, 2023

(30) Foreign Application Priority Data

Jul. 8, 2021 (KR) .................. 10-2021-0089552

(51) Int. Cl.
*B62D 21/15*    (2006.01)
*B60K 11/00*    (2006.01)
*B62D 21/11*    (2006.01)

(52) U.S. Cl.
CPC ............ *B62D 21/152* (2013.01); *B60K 11/00* (2013.01); *B62D 21/11* (2013.01)

(58) Field of Classification Search
CPC ......... B60K 11/08; B60K 11/04; B60K 11/06; B60K 11/02; B60R 19/52; B60R 2019/525
USPC .............. 296/187.09, 193.11, 193.09, 193.1, 296/203.02; 293/115
See application file for complete search history.

(56) References Cited

U.S. PATENT DOCUMENTS

| | | | | |
|---|---|---|---|---|
| 2,612,233 A * | 9/1952 | Newell | ................ | B62D 25/084 296/193.11 |
| 3,595,335 A * | 7/1971 | Wessells, III | ........ | B62D 25/087 180/274 |
| 6,227,321 B1 * | 5/2001 | Frascaroli | .............. | B60K 11/04 296/203.02 |
| 6,382,709 B1 * | 5/2002 | Chirifu | ................ | B62D 29/008 276/29 |
| 6,893,065 B2 * | 5/2005 | Seksaria | ................ | B60R 19/03 296/203.02 |
| 7,219,954 B2 * | 5/2007 | Gomi | ................... | B62D 25/082 296/203.02 |
| 8,128,160 B2 * | 3/2012 | Leanza | ................ | B62D 25/088 296/203.02 |
| 8,152,224 B2 * | 4/2012 | Faruque | ............... | B62D 25/085 296/203.02 |
| 9,738,318 B2 * | 8/2017 | Rompage | ............... | B62D 25/04 |
| 9,751,481 B2 * | 9/2017 | Schneider | ............ | B60R 19/023 |
| 10,195,999 B1 * | 2/2019 | Glickman | ............ | B62D 25/085 |
| 11,254,368 B2 * | 2/2022 | Park | ....................... | B62D 21/11 |
| 11,572,100 B2 * | 2/2023 | Benouali | ................ | B62D 21/11 |
| 11,814,101 B2 * | 11/2023 | Eck | ....................... | B62D 21/152 |

(Continued)

*Primary Examiner* — Amy R Weisberg
*Assistant Examiner* — Veronica M Shull
(74) *Attorney, Agent, or Firm* — Fox Rothschild LLP

(57) ABSTRACT

Embodiments of the present disclosure relate to a vehicle body reinforcement structure of an electric vehicle includes a front side member provided on both sides of the vehicle body along the vehicle body length direction, a cooling module mounted on the front side member, a frunk bar provided at the rear of the cooling module and an extension that mounts the frunk bar to the front side member with the center of the frunk bar being spaced apart from the center of the height direction of the cooling module.

10 Claims, 6 Drawing Sheets

(56) References Cited

U.S. PATENT DOCUMENTS

2015/0314810 A1* 11/2015 Watanabe ............. B62D 21/11
296/203.02

* cited by examiner

VEHICLE BODY REINFORCEMENT STRUCTURE OF ELECTRIC VEHICLE

CROSS-REFERENCE TO RELATED APPLICATION

This application is based on and claims the benefit of Korean Patent Application No. 10-2021-0089552 filed in the Korean Intellectual Property Office on Jul. 8, 2021, the entire contents of which are incorporated herein by reference.

TECHNICAL FIELD

Embodiments of the present disclosure relate to a vehicle body reinforcement structure of an electric vehicle. More particularly, embodiments of the disclosure relate to a vehicle body reinforcement structure of an electric vehicle that reduces the possibility of fire during vehicle collision and improves cooling performance.

DESCRIPTION OF THE RELATED ART

A frunk bar provided to a BEV (Battery Electric Vehicle) is disposed in the width direction of the vehicle body to induce the lateral direction behavior of the vehicle during a small overlap collision to form a lateral direction load path of the vehicle.

Due to the effect of the load path, in the case of a small overlap collision, the vehicle moves in a lateral direction at the beginning of the collision, and the phenomenon that the barrier directly hits the A pillar at the later time of the collision can be prevented.

However, this frunk bar creates resistance to the flow that occurs as the fan of the cooling module rotates. There is also a risk of fire as the cooling fan wiring connector is pinched between the cooling module and the frunk bar in the event of a collision with the front part of the vehicle, resulting in a short circuit.

SUMMARY OF THE DISCLOSURE

Embodiments of the present disclosure have been made in an effort to provide a vehicle body reinforcement structure of an electric vehicle that reduces the possibility of fire during vehicle collision and improves cooling performance.

A vehicle body reinforcement structure of an electric vehicle according to an exemplary embodiment of the present disclosure may include a front side member provided on both sides of the vehicle body along the vehicle body length direction, a cooling module mounted on the front side member, a frunk bar provided at the rear of the cooling module and an extension that mounts the frunk bar to the front side member with the center of the frunk bar being spaced apart from the center of the height direction of the cooling module.

The extension may include a horizontal portion having a shape parallel to the front side member and a slant portion inclined and connected to the front side member.

The frunk bar may include a front part disposed in the front direction of the vehicle body and having a round-shaped cross-section.

The frunk bar may further include a vertical reinforcement that forms a closed cross-section at the rear of the front part along the width direction of the vehicle body.

The frunk bar may further include an auxiliary reinforcement that forms an auxiliary closed cross-section along the width direction of the vehicle body in the rear direction of the vehicle body.

The vehicle body reinforcement structure according to an exemplary embodiment of the present disclosure may further include a strut bar disposed rear of the frunk bar and connecting shock absorber housings provided on both sides of the vehicle body and a coolant hub module mounted on the frunk bar and the strut bar.

A vehicle body reinforcement structure of an electric vehicle according to according to an exemplary embodiment of the present disclosure may include a front side member provided on both sides of the vehicle body along the vehicle body length direction, a cooling module mounted on the front side member, and a frunk bar connected to the front side member from the rear of the cooling module, having a frunk body of a square cross-section shape and a front part formed protrude in front of the frunk body with a round cross-section shape.

The frunk bar may further include an auxiliary reinforcement that forms an auxiliary closed cross-section inside the frunk body along the width direction of the vehicle body.

The vehicle body reinforcement structure according to according to an exemplary embodiment of the present disclosure may further include an extension that mounts the frunk bar to the front side member.

The vehicle body reinforcement structure according to according to an exemplary embodiment of the present disclosure may further include a strut bar disposed rear of the frunk bar and connecting the shock absorber housings provided on both sides of the vehicle body and a coolant hub module mounted on the frunk bar and the strut bar.

According to the vehicle body reinforcement structure of the electric vehicle according to the embodiment of the present disclosure, the mounting position of the trunk bar is spaced apart from the center of the cooling module in the height direction, thereby reducing the possibility of a fire in the event of a vehicle collision.

In addition, according to the vehicle body reinforcement structure of the electric vehicle according to the embodiment of the present disclosure, the shape of the trunk bar may be improved to improve cooling performance.

In addition, according to the vehicle body reinforcement structure of the electric vehicle according to the embodiment of the present disclosure, the shape of the trunk bar may be improved to improve the effect of dispersing the impact load.

In addition, the effects obtainable or predicted by the embodiments of the present disclosure are to be disclosed directly or implicitly in the detailed description of the embodiments of the present disclosure. That is, various effects predicted according to an embodiment of the present disclosure will be disclosed in the detailed description to be described later.

As discussed, vehicles are provided that comprise an apparatus as disclosed herein.

BRIEF DESCRIPTION OF THE DRAWINGS

Since these drawings are for reference in describing an exemplary embodiment of the present disclosure, the technical spirit of the present disclosure should not be construed as being limited to the accompanying drawings.

<Description of symbols>

Figure 1:
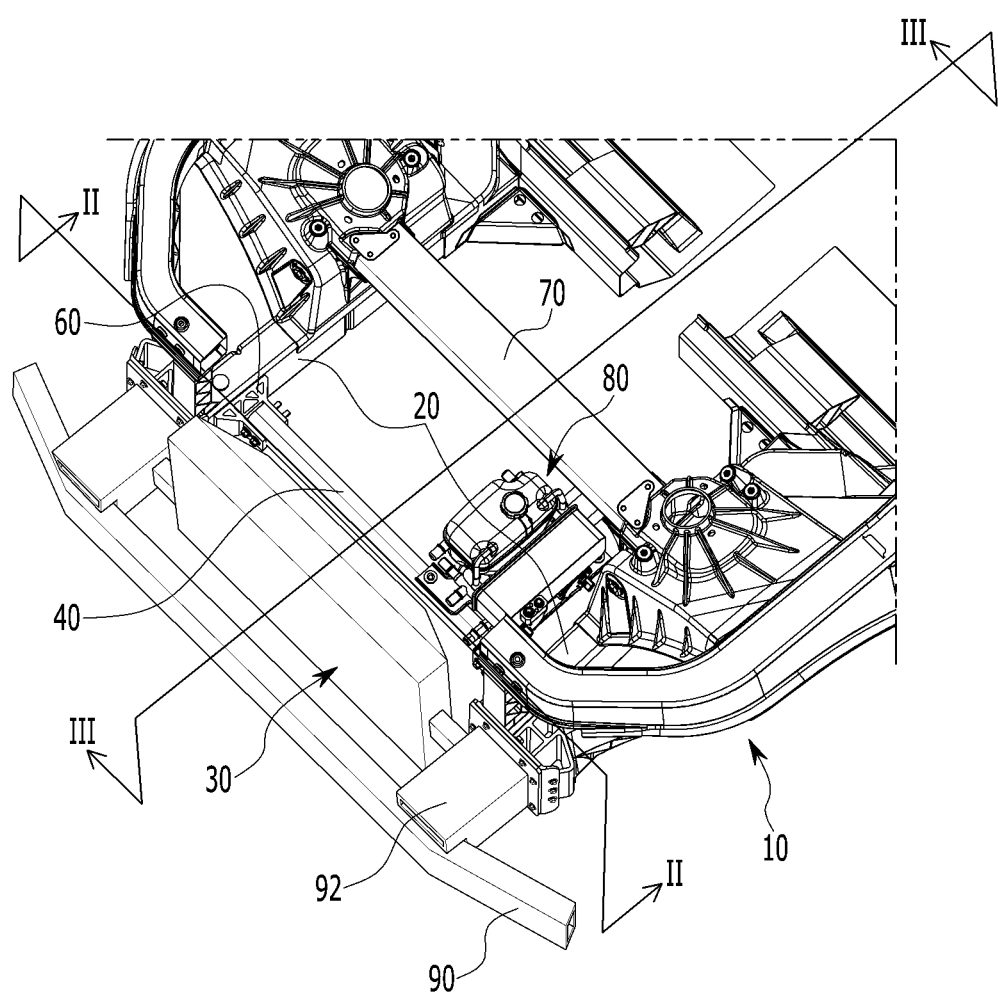
FIG. 1 is a partial perspective view of an electric vehicle on which a frunk bar is mounted according to an exemplary embodiment of the present disclosure.

| | |
|---|---|
| 10: vehicle body | 20: front side member |
| 30: cooling module | 32: wiring connector |
| 40: frunk bar | 42: front part |
| 44: vertical reinforcement | 46: auxiliary reinforcement |
| 48: frunk body | 50: shock absorber housing |
| 60: extension | 62: horizontal portion |
| 64: slant portion | 70: strut bar |
| 80: coolant hub module | 90: bumper beam |
| 92: crash box | |

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, and the like, and includes hybrid vehicles, electric vehicles, plug-in hybrid electric vehicles. As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of embodiments of the present disclosure.

In order to clearly explain embodiments of the present disclosure, parts irrelevant to the description are omitted, and the same reference numerals are assigned to the same or similar elements throughout the specification.

Since the size and thickness of each component shown in the drawings are arbitrarily indicated for convenience of description, embodiments of the present disclosure are not necessarily limited to that shown in the drawings, and the thickness is enlarged to clearly express various parts and regions.

In addition, in the following detailed description, the reason that the names of components are divided into 1st, 2nd, etc. is to classify them in the same relationship, and it is not necessarily limited to the order in the following description.

Throughout the specification, when a part includes a certain element, it means that other elements may be further included, rather than excluding other elements, unless specifically stated otherwise.

In addition, terms such as . . . part, . . . means described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

An exemplary embodiment of the present disclosure will hereinafter be described in detail with reference to the accompanying drawings.

Figure 2:
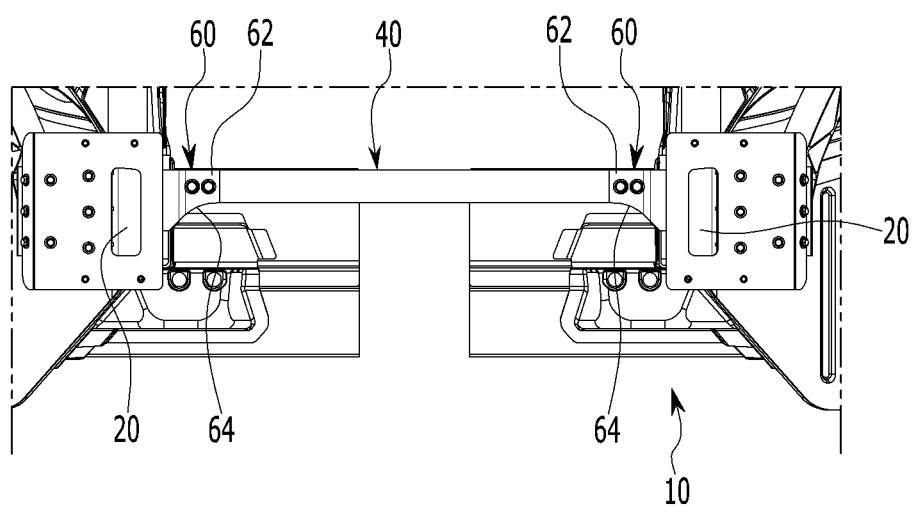
FIG. 2 is a cross-sectional view along the II-II line in FIG. 1.
Figure 3:
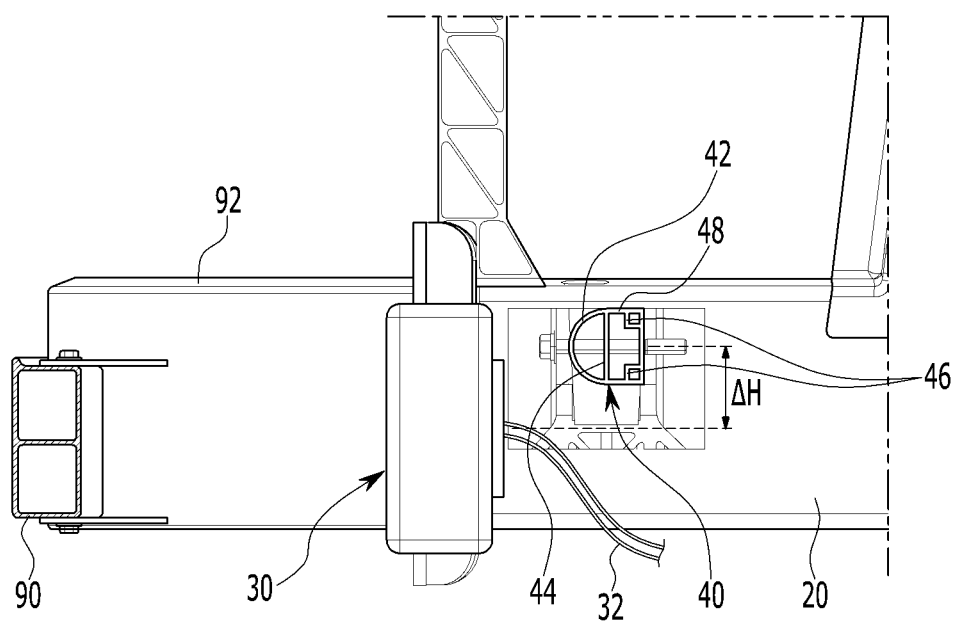
FIG. 3 is a cross-sectional view along the line in FIG. 1.

FIG. 1 is a partial perspective view of an electric vehicle on which a frunk bar is mounted according to an exemplary embodiment of the present disclosure, FIG. 2 is a cross-sectional view along the II-II line in FIG. 1, and FIG. 3 is a cross-sectional view along the line in FIG. 1.

Referring to FIG. 1 to FIG. 3, a body reinforcement structure of an electric vehicle according to an exemplary embodiment of the present disclosure may include front side members 20 provided on both sides of a vehicle body 10 along the vehicle body length direction, respectively, a cooling module 30 mounted on the front side members 20 and a frunk bar 40 provided at the rear of the cooling module 30. And, the frunk bar 40 may be mounted on the front side members 20.

The cooling module 30 may include a cooling fan and a cooling motor.

A bumper beam 90 may be provided in front of the front side members 20, and a crash box 92 may be mounted between the vehicle body 10 and the bumper beam 90.

In the event of a collision with the side of the bumper beam 90, that is, in a small overlap collision, the frunk bar 40 induces a lateral direction behavior of the vehicle body 10, thereby suppressing the direct impact on an A pillar to protect vehicle occupants.

However, in the event of the front collision of the vehicle, there is a risk of fire as the cooling fan wiring connector is pinched between the cooling module and the frunk bar and short-circuited.

The vehicle body reinforcement structure of the electric vehicle according to an exemplary embodiment of the present disclosure may further include an extension 60 that mounts the frunk bar 40 to the front side member 20 with the center of the frunk bar 40 being spaced apart ΔH from the center of the height direction of the cooling module 30.

The frunk bar 40 may be mounted spaced apart ΔH from the center of the height direction of the cooling module 30 to avoid interference between the wiring connector 32 and the frunk bar 40 connected to the cooling module 30 in the event of a front collision of the vehicle. Accordingly, it is possible to prevent a short circuit when the wiring connector 32 contacts the frunk bar 40 when the vehicle collides. In particular, in the case of an electric vehicle, a fire can be quite fatal to the safety of the vehicle and occupant, but it can suppress the possibility of a fire caused by a short circuit of the wiring connector 32, contributing to the safety of the vehicle and occupant.

The extension 60 may include a horizontal portion 62 having a shape parallel to the front side member 20 and a slant portion 64 inclined and connected to the front side member 20.

That is, the extension 60 may be combined with the frunk bar 40 and the front side member 20 in an arch shape so that the height direction center of the frunk bar 40 is spaced apart ΔH from the height direction center of the cooling module 30.

Figure 4:
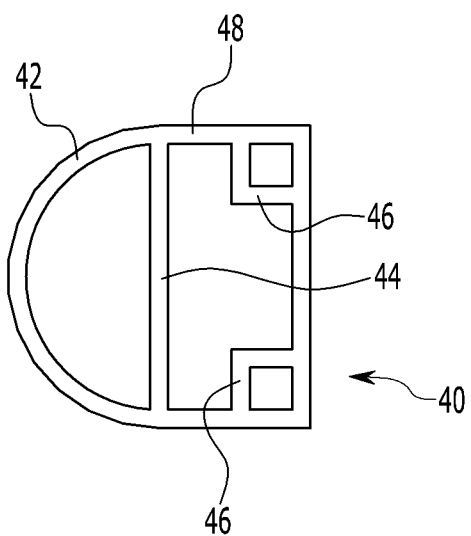
FIG. 4 is a cross-sectional view of a frunk bar that may be applied to an electric vehicle on which a frunk bar according to an exemplary embodiment of the present disclosure is mounted.

FIG. 4 is a cross-sectional view of a frunk bar that may be applied to an electric vehicle on which a frunk bar according to an exemplary embodiment of the present disclosure is mounted.

Referring to FIG. 3 and FIG. 4, the frunk bar 40 may include a front part 42 disposed in the front direction of the vehicle body and having a round-shaped cross-section.

A general frunk bar has a rectangular cross-section shape, and the flow resistance during rotation of the cooling fan is considerable, which may deteriorate fuel efficiency.

However, in the vehicle body reinforcement structure of the electric vehicle according to an exemplary embodiment of the present disclosure, the front part 42 formed in front of the frunk bar 40 has a cross-section of a round shape to reduce the flow resistance of air.

For example, in the case of a general rectangular cross-section shape, the air resistance coefficient Cd is about 1.15, but the round shape of the front part 42 shown in the drawing, for example, a cross-section of a semicircle shape has an air resistance coefficient Cd is about 0.42, which can improve the fuel efficiency of the vehicle.

The frunk bar 40 may further include a vertical reinforcement 44 that forms a closed cross-section at the rear of the front part 42 along the width direction of the vehicle body. The vertical reinforcement 44 may increase the strength of the frunk bar 40 together with the front part 42.

In other words, the frunk bar 40 may include a frunk body 48 of a square cross-section shape and the front part 42 having a rounded cross-section shape and formed protrude in front of the frunk body 48.

That is, the front part 42 may be additionally mounted on the frunk body 48 of the square cross-section shape to lower the air resistance coefficient and increase the strength of the frunk bar 40.

In addition, even if the front part 42 having a cross-section having a round shape occurs in contact with the wiring connector 32, a short circuit of the wiring connector 32 may be prevented by the shape of the front part 42.

The frunk bar 40 may further include an auxiliary reinforcement 46 that forms an auxiliary closed cross-section along the width direction of the vehicle body in the rear direction of the vehicle body.

In the event of a small overlap collision, the compress load is concentrated on the rear edge of the frunk bar, which may cause breakage or buckling of the frunk bar.

However, in the vehicle body reinforcement structure of the electric vehicle according to an exemplary embodiment of the present disclosure, the auxiliary reinforcement 46 formed along the width direction of the vehicle body in the rear direction of the vehicle body 10 increases the strength of the frunk bar 40, and thus it may suppress breakage or buckling of the frunk bar 40.

In addition, the volume of the frunk bar 40 may be reduced by adding the auxiliary reinforcement 46, and air resistance may be reduced through this.

Figure 5:
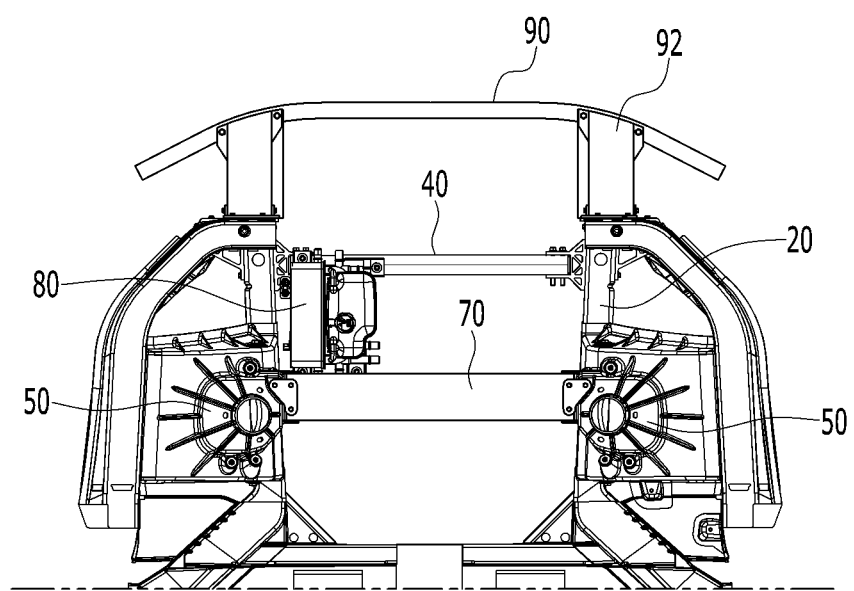
FIG. 5 is a top plan view of a part of an electric vehicle on which a frunk bar is mounted according to an exemplary embodiment of the present disclosure.

FIG. 5 is a top plan view of a part of an electric vehicle on which a frunk bar is mounted according to an exemplary embodiment of the present disclosure.

Referring to FIG. 1 and FIG. 5, the vehicle body reinforcement structure of the electric vehicle according to an exemplary embodiment of the present disclosure may further include a strut bar 70 disposed rear of the frunk bar 40 and connecting shock absorber housings 50 provided on both sides of the vehicle body and a coolant hub module 80 mounted on the frunk bar 40 and the strut bar 70.

The coolant hub module 80 may be cooled by the cooling module 30 and be mounted through the frunk bar 40 and the strut bar 70 to increase spatial utility.

Figure 6:
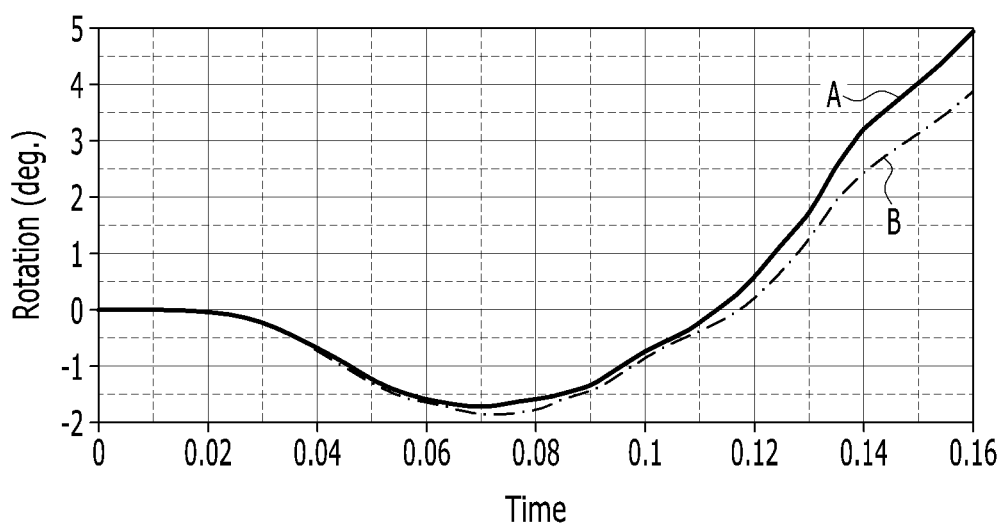
FIG. 6 is a graph showing the yaw behavior of an electric vehicle on which a frunk bar according to an exemplary embodiment of the present disclosure is mounted.

FIG. 6 is a graph showing the yaw behavior of an electric vehicle on which a frunk bar according to an exemplary embodiment of the present disclosure is mounted.

In FIG. 6, the A line is a graph showing the lateral direction movement of the electric vehicle mounted with a general frunk bar, and the B line is a graph showing the lateral direction movement of the electric vehicle on which the frunk bar according to an exemplary embodiment of the present disclosure is mounted.

As shown in the drawing, the electric vehicle equipped with the frunk bar according to an embodiment of the present disclosure may improve the lateral direction characteristic (Yawing behavior) by about 1.04 degrees.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A vehicle body reinforcement structure of an electric vehicle comprising:
   a front side member provided on both sides of the vehicle body along a vehicle body length direction;
   a cooling module mounted on the front side member;
   a frunk bar provided at a rear of the cooling module;
   an extension that mounts the frunk bar to the front side member with a center of the frunk bar being spaced apart from a center of a height direction of the cooling module;
   a strut bad disposed rear of the frunk bar and connecting shock absorber housing provided on both sides of the vehicle body; and a coolant hub module mounted on the frunk bar and the strut bar.

2. The vehicle body reinforcement structure of claim 1, wherein the extension comprises:
   a horizontal portion having a shape parallel to the front side member; and
   a slant portion inclined and connected to the front side member.

3. The vehicle body reinforcement structure of claim 1, wherein the frunk bar comprises a front part disposed in a front direction of the vehicle body and having a round-shaped cross-section.

4. The vehicle body reinforcement structure of claim 3, wherein the frunk bar further comprises a vertical reinforcement that forms a closed cross-section at a rear of the front part along a width direction of the vehicle body.

5. The vehicle body reinforcement structure of claim 3, wherein the frunk bar further comprises an auxiliary reinforcement that forms an auxiliary closed cross-section along the width direction of the vehicle body in a rear direction of the vehicle body.

6. A vehicle body reinforcement structure of an electric vehicle comprising:
   a front side member provided on both sides of the vehicle body along a vehicle body length direction;
   a cooling module mounted on the front side member; and
   a frunk bar connected to the front side member from a rear of the cooling module, having a frunk body of a square cross-section shape and a front part formed to protrude in front of the frunk body with a rounded cross-section shape.

7. The vehicle body reinforcement structure of claim 6, wherein the frunk bar further comprises an auxiliary reinforcement that forms an auxiliary closed cross-section inside the frunk body along a width direction of the vehicle body.

8. The vehicle body reinforcement structure of claim 6, further comprising an extension that mounts the frunk bar to the front side member.

9. The vehicle body reinforcement structure of claim 6, further comprising:
   a strut bar disposed rear of the frunk bar and connecting the shock absorber housings provided on both sides of the vehicle body; and
   a coolant hub module mounted on the frunk bar and the strut bar.

10. A vehicle comprising the vehicle body reinforcement structure of claim 1.

* * * * *